US008657057B2

(12) United States Patent
Bolz et al.

(10) Patent No.: US 8,657,057 B2
(45) Date of Patent: Feb. 25, 2014

(54) CONSTRUCTION MACHINE OR TRANSFER APPARATUS

(75) Inventors: Gerhard Bolz, Kirchdorf/Iller (DE); Rolf Eberhardt, Erbach (DE); Stefan Schott, Memmingen (DE)

(73) Assignee: Liebherr-Hydraulikbagger GmbH, Kirchdorf/Iller (DE)

( * ) Notice: Subject to any disclaimer, the term of this patent is extended or adjusted under 35 U.S.C. 154(b) by 267 days.

(21) Appl. No.: 13/087,677

(22) Filed: Apr. 15, 2011

(65) Prior Publication Data
US 2011/0253467 A1  Oct. 20, 2011

(30) Foreign Application Priority Data
Apr. 16, 2010  (DE) .................. 10 2010 015 163

(51) Int. Cl.
*B60K 11/02*  (2006.01)
(52) U.S. Cl.
USPC .................. 180/291; 180/312; 296/190.03
(58) Field of Classification Search
CPC .... B62D 21/186; B62D 33/06; B62D 63/025; E02F 9/08; E02F 9/121
USPC .................. 180/291, 312, 68.4, 69.6, 305; 296/193.01, 193.04, 190.01, 190.04; 212/180
See application file for complete search history.

(56) References Cited

U.S. PATENT DOCUMENTS

| | | | |
|---|---|---|---|
| 1,817,905 A | | 8/1931 | Bager et al. |
| 3,645,350 A | * | 2/1972 | Deli et al. ................ 180/9.1 |
| 3,768,856 A | * | 10/1973 | Stuller .................. 296/190.03 |
| 4,150,474 A | * | 4/1979 | Bauer et al. .................. 29/463 |
| 4,582,205 A | * | 4/1986 | Berger et al. ................ 212/175 |
| 4,593,786 A | * | 6/1986 | Tate ................................. 180/291 |
| 4,711,467 A | * | 12/1987 | Link et al. ...................... 280/785 |
| 5,033,567 A | * | 7/1991 | Washburn et al. .......... 180/89.12 |
| 5,064,242 A | * | 11/1991 | Fujan et al. ............. 296/190.03 |
| 5,065,814 A | * | 11/1991 | Loeber et al. .................... 165/41 |
| 5,150,942 A | * | 9/1992 | Fujan et al. ............. 296/190.03 |
| 5,373,909 A | * | 12/1994 | Dow et al. ...................... 180/9.1 |
| 5,533,587 A | * | 7/1996 | Dow et al. ...................... 180/235 |
| 6,022,048 A | * | 2/2000 | Harshbarger et al. ......... 280/781 |
| 6,098,739 A | * | 8/2000 | Anderson et al. ............. 180/312 |

(Continued)

FOREIGN PATENT DOCUMENTS

| | | |
|---|---|---|
| DE | 4219803 A1 | 12/1993 |
| DE | 195 23 001 A1 | 6/1996 |

(Continued)

OTHER PUBLICATIONS

ISA German Patent and Trademark Office, Search Report of DE 10 2010 015 163.7, Feb. 3, 2011, 4 pages.

*Primary Examiner* — Katy M Ebner
*Assistant Examiner* — Brodie Follman
(74) *Attorney, Agent, or Firm* — Alleman Hall McCoy Russell & Tuttle LLP

(57) ABSTRACT

The present disclosure relates to an apparatus, in particular a construction machine configured as a mobile excavator or a transfer apparatus, having an undercarriage carrying a chassis and having a superstructure connected thereto, wherein the superstructure is made up in a modular manner of at least two modules which can be releasably coupled to one another, and wherein at least one drive module is provided which forms an operable unit of a machine drive and a machine cooling system and at least one further module includes one or more superstructure components.

18 Claims, 1 Drawing Sheet

(56) References Cited

U.S. PATENT DOCUMENTS

| | | | |
|---|---|---|---|
| 6,108,907 A * | 8/2000 | Anderson et al. | 29/897.2 |
| 6,167,980 B1 * | 1/2001 | Anderson et al. | 180/311 |
| 6,293,364 B1 * | 9/2001 | Anderson et al. | 180/312 |
| 6,494,285 B1 * | 12/2002 | Williams | 180/291 |
| 6,582,010 B2 * | 6/2003 | Sakyo et al. | 296/190.08 |
| 6,604,600 B2 * | 8/2003 | Fournier et al. | 180/299 |
| 6,736,232 B1 * | 5/2004 | Bergstrom et al. | 180/292 |
| 6,923,282 B2 * | 8/2005 | Chernoff et al. | 180/65.22 |
| 7,124,853 B1 | 10/2006 | Kole, Jr. | |
| 7,140,640 B2 * | 11/2006 | Tronville et al. | 280/781 |
| 7,156,200 B2 * | 1/2007 | Dershem et al. | 180/311 |
| 7,344,187 B2 * | 3/2008 | Murakami | 296/190.03 |
| 7,419,021 B2 * | 9/2008 | Morrow et al. | 180/65.22 |
| 7,445,272 B2 * | 11/2008 | Lee | 296/190.03 |
| 7,614,473 B2 * | 11/2009 | Ono et al. | 180/299 |
| 7,665,801 B2 * | 2/2010 | Lee | 296/193.03 |
| 7,770,963 B2 * | 8/2010 | Tsukamoto et al. | 296/190.08 |
| 7,806,214 B2 * | 10/2010 | Tsukui et al. | 180/89.17 |
| 7,854,284 B2 * | 12/2010 | Wada et al. | 180/89.13 |
| 7,887,124 B2 * | 2/2011 | Tsukamoto | 296/190.08 |
| 7,913,788 B1 * | 3/2011 | Bryer et al. | 180/68.5 |
| 7,913,789 B2 * | 3/2011 | Lee | 180/89.12 |
| 8,128,155 B2 * | 3/2012 | Ansorge | 296/190.03 |
| 8,201,649 B2 * | 6/2012 | Andrus et al. | 180/9.48 |
| 8,235,156 B2 * | 8/2012 | Koss | 180/89.12 |
| 8,240,415 B2 * | 8/2012 | Okada et al. | 180/89.17 |
| 8,365,855 B2 * | 2/2013 | Mamada et al. | 180/68.1 |
| 2002/0153748 A1 * | 10/2002 | Sakyo et al. | 296/190.08 |
| 2003/0164255 A1 * | 9/2003 | Borroni-Bird et al. | 180/54.1 |
| 2004/0026153 A1 * | 2/2004 | Dershem et al. | 180/311 |
| 2005/0000121 A1 * | 1/2005 | Mori | 37/347 |
| 2005/0161935 A1 * | 7/2005 | Ono et al. | 280/834 |
| 2006/0158006 A1 * | 7/2006 | Mori | 296/190.03 |
| 2007/0018484 A1 * | 1/2007 | Lee | 296/190.08 |
| 2007/0056786 A1 * | 3/2007 | Fukazawa et al. | 180/89.12 |
| 2007/0131466 A1 * | 6/2007 | Gutzwiller et al. | 180/89.1 |
| 2007/0175849 A1 * | 8/2007 | Yokoyama et al. | 212/180 |
| 2008/0073938 A1 * | 3/2008 | Lee | 296/190.08 |
| 2008/0282586 A1 * | 11/2008 | Wada et al. | 37/466 |
| 2009/0084621 A1 * | 4/2009 | Giovannini et al. | 180/89.1 |
| 2009/0115223 A1 * | 5/2009 | Tsukamoto | 296/190.04 |
| 2009/0127888 A1 * | 5/2009 | Tsukamoto et al. | 296/190.03 |
| 2010/0258364 A1 * | 10/2010 | Bolz et al. | 180/9.1 |
| 2011/0005847 A1 * | 1/2011 | Andrus et al. | 180/9.1 |
| 2013/0009423 A1 * | 1/2013 | Yamamoto et al. | 296/190.08 |
| 2013/0026789 A1 * | 1/2013 | Schott et al. | 296/193.01 |

FOREIGN PATENT DOCUMENTS

| | | |
|---|---|---|
| EP | 0 745 528 A2 | 12/1996 |
| EP | 1 647 635 A2 | 4/2006 |
| EP | 1 562 818 B1 | 10/2009 |
| GB | 2189754 A | 11/1987 |
| JP | 2002097666 A | 4/2002 |
| WO | 99/49138 A1 | 9/1999 |

* cited by examiner

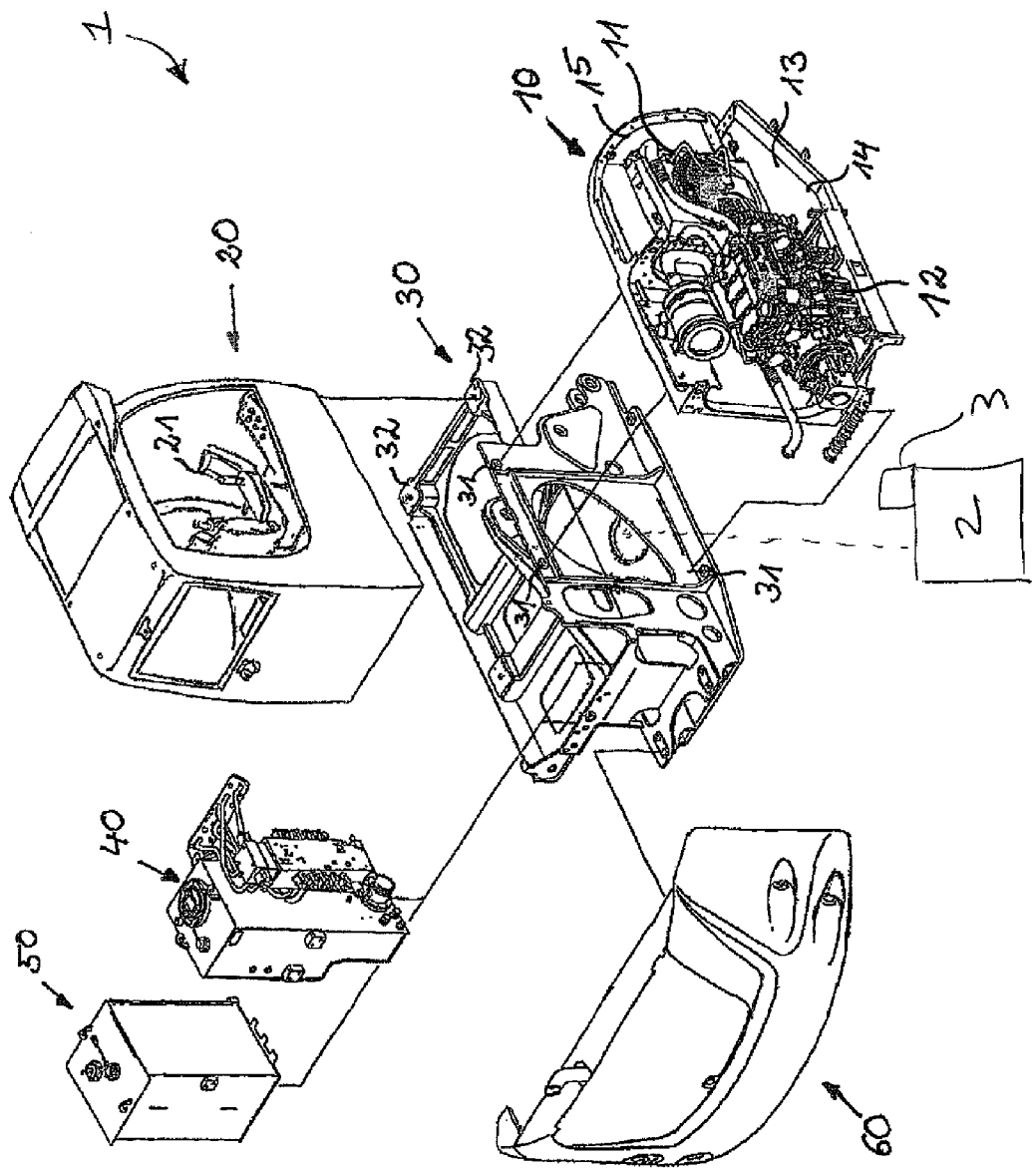

CONSTRUCTION MACHINE OR TRANSFER APPARATUS

CROSS REFERENCE TO RELATED APPLICATION

This application claims priority to German Patent Application No. 10 2010 015 163.7, entitled "Construction Machine or Transfer Apparatus", filed Apr. 16, 2010, which is hereby incorporated by reference in its entirety for all purposes.

TECHNICAL FIELD

The present disclosure relates to an apparatus, in particular to a construction machine configured as a mobile excavator or a transfer apparatus configured as a mobile excavator, having an undercarriage carrying a chassis and a superstructure pivotally connected thereto.

BACKGROUND AND SUMMARY

Construction machines in particular differ in the manner of the attachments used and in the manner of the chassis frame used. With generic construction machines, the undercarriage carries the chassis frame, which can, for example, be configured as a simple wheel chassis frame or as a tracked chassis frame. The superstructure of the construction machine is in turn preferably rotatably pivotally connected to the undercarriage. The superstructure itself substantially comprises a rigid substructure on whose upper side at least a part of or all the components of the construction machine are arranged at predetermined and on fixed installation positions. As a rule, the installation of the individual components on the superstructure takes place during the production in the factory of the manufacturer. The individual components are installed on the superstructure sequentially and are wired or connected to one another ready for use. A subsequent replacement of individual components is frequently not provided in line with the functional principle or is only possible with a great effort. It is rather the case that the total construction machine has to be moved into an assembly hall provided for this purpose for the replacement of a component for repair.

The superstructure is also as a rule configured such that it is only suitable for the reception of the individual components specifically designed therefor. An upgrade of individual machine components, e.g. the installation of a drive unit of a higher stage, can usually not be carried out without adapting the substructure.

While taking account of the aforesaid problems, it is the object of the present disclosure to provide an alternative construction approach for the superstructure of a generic construction machine or of a transfer apparatus.

This object is achieved by an apparatus, in particular a construction machine configured as a mobile excavator or a transfer apparatus of corresponding structure. The apparatus is accordingly provided with an undercarriage supporting a chassis and a superstructure pivotally connected thereto. The superstructure of the apparatus does not, in accordance with the present disclosure, have a single rigid substructure, but is instead in a modular manner made up of at least two modules which can be releasably coupled to one another for the complete assembly of the superstructure. At least one of the at least two modules is configured as a drive module which forms an operable unit of machine drive and machine cooling system. Furthermore, at least one further module is provided which includes at least one of or all of the further components of the superstructure. The superstructure of the construction machine is consequently made up of at least two modules which are indirectly or directly connected to the undercarriage of the construction machine in a known manner.

A particular advantage of the present disclosure results in that the individual modules of the superstructure can be modified or adapted independently of one another. Only the coupling mechanism should be configured in accordance with a predefined standard for reasons of compatibility. There is thus the possibility of already manufacturing different kinds of drive modules during the production phase of the construction machine which differ from one another with respect to the performance data. The construction machine can accordingly be adapted very simply, optionally also subsequently, to the desired demands of the purchaser since the individual drive module versions can be selectively coupled to the remaining modules of the construction machine in accordance with the module principle and the superstructure can be individually designed in accordance with the specifications. The same naturally applies to all further required modules which can likewise be configured in different versions.

A further substantial advantage of the present disclosure is that the drive module is configured as a functional unit. This requires that, in addition to the required driving unit or units, the required cooling system of the machine is also already integrated in the drive module and is wired or cabled to the unit in advance ready for operation. The module formed is already operable before the final installation on the superstructure and can be checked and tested exhaustively for its proper operability before the final installation, which results in substantial production and quality benefits.

The present disclosure furthermore provides the possibility that a fast repair of the construction machine can take place on site where required. The individual modules can be dismantled from the superstructure without complications and can be replaced with operable modules.

The drive module advantageously includes at least one internal combustion engine and/or a drive unit for a hydraulic apparatus. The internal combustion engine serves to drive the chassis at the undercarriage and optionally to supply the energy of a drive unit for a hydraulic apparatus. The drive unit of the hydraulic apparatus preferably includes a hydraulic pump which is a component of the hydraulic circuit for driving the installed attachment at the superstructure. A plurality of internal combustion engines or also electric motors can naturally also be accommodated in the module which permits a separate and simultaneously independent energy supply of the various drivetrains.

In an advantageous embodiment, the drive module includes a frame or a rack serving to receive the drive unit or units as well as the cooling system. The frame can be configured in one part or in multiple parts. Separate frame parts are preferably provided for the reception of the individual module components which can be connected to one another to manufacture the drive module.

Provision can furthermore be made that a module includes a hydraulic tank and/or a fuel tank.

Provision can furthermore be made that a module includes a control unit, in particular a hydraulic control. The control unit is preferably responsible for the engine control and for usual machine functions. The hydraulic unit in the drive module can be controlled with the aid of the hydraulic control and a provided attachment at the superstructure can be operated accordingly.

Provision can furthermore be made that a module includes the operator's cabin/driver's cabin. At least one control unit and/or the hydraulic control can generally already be integrated in the operator's cabin or can be configured as a discrete module.

In a particularly preferred embodiment of the present disclosure, provision can be made that all or at least a substantial part of the required hydraulic valves of the hydraulic circuit are combined in a separate module. The valve arrangement is responsible for the complex regulation process within the hydraulic system and is already connected or wired together in advance on the manufacture of the module. A substantial part of the hydraulic circuit can thus already be exhaustively tested before the final installation. Only on the final assembly of the superstructure is the hydraulic circuit completed by connection the module to the tank and to the hydraulic control. All further components of the hydraulic circuit can likewise already be tested before the final assembly.

In a further advantageous embodiment of the apparatus in accordance with the present disclosure, at least one module is provided which forms the base frame of the superstructure. The base frame preferably represents the central component of the superstructure to which all or at least a substantial number of the further modules can be indirectly or directly releasably coupled. It is conceivable that individual modules can be coupled to the base frame laterally by a connection. A module can likewise be coupled to the upper side of the base frame.

The base frame advantageously provides a connection for the preferably releasable connection of the superstructure to the undercarriage. To configure the superstructure as rotatable, this connection can include a corresponding pivot joint.

Since the aforesaid base frame as a rule represents a stable steel construction, it is expedient to arrange at least one hydraulic tank and/or at least one fuel tank in the formed hollow space of the base frame. The tanks are protected against damage by the steel construction, whereby the operating safety of the construction machine is increased. This furthermore corresponds to a particularly space-saving arrangement.

To design the coupling process between the individual modules in as simple a manner as possible and with as little complexity as possible, it is of advantage if all or a number of the modules have connections for establishing at least one supply line. The connections preferably include a coupling for hydraulic lines or fuel lines or other supply and signal lines. The corresponding connection should also be kept compatible with different embodiments of the individual modules so that a simple installation of the modules to the superstructure is ensured independently of the versions.

The present disclosure is furthermore directed to a module for a modular-type superstructure of a construction machine or of a transfer apparatus in accordance with one of the preceding features. The module in accordance with the advantage is configured as a discrete, operable unit which includes at least one machine drive unit as well as a machine cooling system and which is already wired and cabled in advance ready for operation.

Possible embodiments and features of the module in accordance with the present disclosure substantially correspond to the above embodiments and features of the construction machine or of the transfer apparatus so that a repeated explanation will be omitted at this point.

The modular configuration of the superstructure of the apparatus in accordance with the present disclosure simplifies the total installation process and production process and results in substantial cost savings. The construction machine manufacturer is thus given the possibility, for example, of manufacturing the individual modules at separate production sites and to check them independently extensively as to their operability. The individual modules only have to be delivered to the final installation site for the final assembly of the apparatus. Such a decentralized production process not only provides substantial cost benefits, but also results in a considerably increase in quality of the manufactured end products.

Further features and advantages of the present disclosure will be explained in more detail with reference to the only embodiment shown in the FIGURE.

BRIEF DESCRIPTION OF THE FIGURE

FIG. 1 shows an exploded representation of construction machine components.

DETAILED DESCRIPTION

The only Figure shows an exploded representation of the superstructure 1 of a construction machine in accordance with the present disclosure shown by way of example here. The base frame 30 configured as a steel construction serves as the central element of the superstructure. A pivot joint for rotatable fastening of the superstructure 1 to the undercarriage 2 of the construction machine is located at the lower side of the base frame 30. The undercarriage 2 may support a chassis 3. The connection between the superstructure and the undercarriage can naturally also be made rigid.

The base frame 30 can be made in one piece, but the present disclosure is not restricted to such an embodiment. The base frame 30 can be described by a substantially parallelepiped body shape, wherein the individual surfaces have numerous cut-outs and additional reinforcements such as lateral or longitudinal struts. The base frame 30 may be a steel construction, for example.

The drive module 10 can be releasably coupled via a corresponding connection 31 on the side wall of the steel construction 30 disposed at the right in the direction of travel. The drive module 10 in this respect includes an internal combustion engine 12 which is cooled to the permitted operating temperature by the cooling system 11. The radiator fan belonging to the cooling system 11 is also integrated and preferably orientated with an outwardly facing suction direction. The individual components of the drive module 10 are already fastened and wired and connected to one another long before the final assembly of the construction machines in a frame 13 provided for this purpose, whereby an operable discrete unit is formed. This unit can already be put into operation and tested exhaustively as to its function before the final assembly has taken place. Once the quality of the drive module 10 has been ensured, it is fastened to the base frame 30 as explained above during the final assembly of the construction machine.

The frame 13 has a base surface 14 and an inwardly disposed side surface 15 adjoining it to form an L shape. Furthermore, further struts, not shown, can extend from the upwardly disposed edge of the side surface 15 to the outer edge of the base surface 13 to which one or more grids can be fastened to protect the components. A cage-like construction of the frame 13 hereby results. The frame 13 can generally be configured in multiple parts, wherein the individual frame parts serve the separate reception of the individual components of the drive module 10 and are connected to one another to form the module 10.

A further module furthermore includes the driver's cabin/operator's cabin 20 which is likewise manufactured and tested separately during the production process. The operator's cabin 20, which receives individual control components of the construction machine as well as an operating panel 21 as required, is releasably coupled to the upper side of the base frame 30 by matching connection 32. Required control lines of the driver's cabin 20 are connected to the corresponding connections of the drive module 10 in the final assembly.

The construction machine of the only FIGURE has an attachment, not shown, which is supplied via a hydraulic circuit. In an embodiment as a hydraulic excavator, the excavator shovel is actuated via the hydraulic circuit of the superstructure. The energy supply of the hydraulic circuit likewise takes place via the drive module 10. The internal combustion engine 12 of the drive module 10 drives a corresponding hydraulic pump which is integrated either in the drive module 10 or in a different module.

The total valve arrangement of the hydraulic circuit is advantageously installed separately in its own unit and is shown by the module 40 in the FIGURE. All technical regulation components of the hydraulic circuit are integrated in the unit 40 and are already wired to one another before the final installation so that the module 40 only still has to be connected to the hydraulic tank as well as to the drive module 10 and to the hydraulic attachment. A complex structure of the hydraulic lines or of the hydraulic circuit during the final installation is thus no longer necessary. The switching arrangement of the hydraulic valves can already be exhaustively tested and checked as to their correct operability during the production of the unit 40

The supply tank 50 is shown as a further module in the FIGURE. It preferably includes the hydraulic tank for the supply of the hydraulic circuit with a hydraulic medium. Furthermore, the module 50 can also include the fuel tank for the supply of the drive unit 10. The module 50 and the hydraulic valve unit 40 are installed on the rear side of the base frame 30. Once all the modules are installed at the base frame 30, the covering 60 is fixed to the base frame 30.

The invention claimed is:

1. An apparatus, comprising:
an undercarriage carrying a chassis and having a modular superstructure connected thereto, wherein the superstructure includes at least two independently assembled modules which can be releasably coupled to another, the at least two modules including a drive module including a machine drive and a machine cooling system forming an operable unit, and a supply tank module releasably coupled to the superstructure, wherein at least a substantial number of hydraulic valves required by a hydraulic circuit are combined in a separate module from the at least two modules.

2. An apparatus in accordance with claim 1, wherein the drive module includes at least one internal combustion engine and/or a drive unit for a hydraulic apparatus.

3. An apparatus in accordance with claim 1, wherein the drive module includes at least one frame or one rack for receiving drive components.

4. An apparatus in accordance with claim 1, wherein one of the at least two modules includes a hydraulic tank and/or fuel tank.

5. An apparatus in accordance with claim 1, wherein at least one of the at least two modules includes a hydraulic control unit.

6. An apparatus in accordance with claim 1, wherein one of the at least two modules includes a machine cabin.

7. An apparatus in accordance with claim 1, further comprising a module forming a main frame of the superstructure to which all further modules can be releasably, indirectly, or directly coupled.

8. An apparatus in accordance with claim 1, wherein the at least two modules have a connection for establishing a supply line.

9. An apparatus in accordance with claim 1, wherein the apparatus is configured as a mobile excavator or a transfer apparatus.

10. An apparatus, comprising:
an undercarriage carrying a chassis;
a modular superstructure connected to the undercarriage, the superstructure comprising a base frame, a drive module releasably coupled to a side wall of the base frame and forming an operable unit of a machine drive and a machine cooling system, a hydraulic module releasably coupled to a rear wall of the base frame, a supply tank module releasably coupled to the rear wall of the base frame, and at least one further module including one or more superstructure components, wherein the superstructure does not have any rigid substructure.

11. An apparatus in accordance with claim 10, wherein the drive module includes at least one internal combustion engine and/or a drive unit for a hydraulic apparatus.

12. An apparatus in accordance with claim 11, wherein the drive module includes at least one frame or one rack for receiving drive components.

13. An apparatus in accordance with claim 12, wherein one of the drive module, the hydraulic module, the supply tank module, and the at least one further module includes a hydraulic tank and/or fuel tank.

14. An apparatus in accordance with claim 13, wherein at least one of the modules includes a hydraulic control unit.

15. An apparatus in accordance with claim 14, wherein one of the drive module, the hydraulic module, the supply tank module, and the at least one further module includes a machine cabin.

16. An apparatus in accordance with claim 15, wherein at least a substantial number of hydraulic valves are combined in a separate module from the at least two modules.

17. An apparatus in accordance with claim 16, wherein the base frame forms a main frame of the superstructure to which all further modules can be releasably, indirectly, or directly coupled.

18. An apparatus in accordance with claim 17, wherein the drive module, the hydraulic module, the supply tank module, and the at least one further module have a connection for establishing a supply line.

* * * * *